United States Patent [19]

Cung et al.

[11] Patent Number: 5,173,879

[45] Date of Patent: Dec. 22, 1992

[54] SURFACE-CONSISTENT MINIMUM-PHASE DECONVOLUTION

[75] Inventors: Vu K. Cung, Houston; Kattemalvadi R. S. Devi, Sugarland; Elliott G. Flowers, Jr., Houston; Chris T. Corcoran, Bellaire, all of Tex.; Stephen J. Chapman, San Francisco, Calif.

[73] Assignee: Shell Oil Company, Houston, Tex.

[21] Appl. No.: 904,296

[22] Filed: Jun. 25, 1992

[51] Int. Cl.⁵ .............................................. G01V 1/36
[52] U.S. Cl. ......................................... 367/46; 367/21
[58] Field of Search ...................... 367/21, 24, 38, 46; 364/421

[56] References Cited

U.S. PATENT DOCUMENTS

| | | | |
|---|---|---|---|
| 4,110,729 | 8/1978 | Vreugde | 364/421 |
| 4,218,766 | 8/1980 | Parrack et al. | 367/47 |
| 4,556,962 | 12/1985 | Widrow | 367/45 |
| 4,723,231 | 2/1988 | Sallas | 367/189 |
| 4,757,480 | 7/1988 | Gutowski | 367/47 |
| 4,888,743 | 12/1989 | Thomsen | 367/75 |
| 4,890,264 | 12/1989 | Crews et al. | 367/45 |
| 4,935,905 | 6/1990 | Gassaway | 367/59 |
| 5,010,976 | 4/1991 | Airhart | 367/38 |

FOREIGN PATENT DOCUMENTS 1256193 6/1980 Canada.
2133148A 9/1983 United Kingdom.

OTHER PUBLICATIONS

*Seismic Data Processing*, Özdogan Yilmaz; Stephen M. Doherty, Editor, Society of Exploration Geophysicists, Tulsa, Okla., p. 506.

*Primary Examiner*—Ian J. Lobo
*Attorney, Agent, or Firm*—Fred S. Reynolds, Jr.

[57] ABSTRACT

A method is provided for adaptive minimum-phase deconvolution. The deconvolution method removes source and receiver wavelet variations in a surface-consistent manner from traces of a seismic survey which has the traces indexed by source and receiver locations. A plurality of source-pairs and a plurality of a receiver-pairs are selected from the traces. Each source-pair has two designated sources and each receiver-pair has two designated receivers. Cross-correlations are performed on traces in each source-pair which have common receivers to provide a source-pair cross-correlation signal for each common receiver. Cross-correlation are performed on traces in each receiver-pair which have common sources to provide a receiver-pair cross-correlation signal for each common source. The cross-correlation signals of each receiver-pair and each source-pair are stacked to provide stacked cross-correlation signals. The stacked signals are then used in a surface-consistent convolutional model to obtain within a selected bandpass an amplitude frequency spectrum for each source and receiver wavelet. In one embodiment, an edited amplitude spectrum is obtained. A minimum-phase wavelet spectrum is then determined from each edited amplitude spectrum using a Hilbert transform. The minimum-phase wavelet spectra are then used to determine a two-sided finite-length time domain deconvolution filter for each source and receiver location. The respective filters for each location are then convolved with the trace to deconvolve the trace.

32 Claims, 7 Drawing Sheets 50a 50b 50c 50d 50e 50f 50g 50h 50i 50j 50k 50l 50m     52

SURFACE-CONSISTENT MINIMUM-PHASE DECONVOLUTION

Background of the Invention

1. Field of the Invention

This invention relates to a method for processing seismic data and more particularly to a method for deconvolution of seismic traces.

2. Description of the Related Art

Conventional seismic acquisition techniques involve the use of sources to generate seismic energy and sets of receivers, spread out along or near the surface of the earth or at or near the water surface or water bottom in a water covered area, to detect reflected seismic signals, due to seismic energy striking sub-surface geologic boundaries. These signals are recorded as a function of time and subsequent processing of these time varying signals, i.e. seismic traces or seismogram is designed to reconstruct an appropriate image of geologic boundaries of the subsurface and to obtain information about the subsurface materials.

The method of this invention involves deconvolution of the recorded seismic trace. Deconvolution is necessary because the sub-surface geologic boundaries have adjacent layers which have different lithology and physical properties. These layers present different densities and velocities to a seismic signal initialed by the source. The product of density and velocity of seismic energy transmission through each layer is called seismic impedance. The impedance contrast between adjacent layers causes the reflections that are recorded on the seismic traces. The recorded seismic trace can be modeled as a convolution of the earth's impulse response with the seismic signal produced by the source. However, the reflected recorded seismic signal has many components which mask the response of the seismic signal to the reflection boundary. Ideally, a source would produce a seismic signal in the form of a band-limited spike and the recorded reflected seismic signal would only show the response of that signal to the boundary. Deconvolution is a process by which some of the components on the recorded seismic signal are removed and signal components are compressed to approach the ideal seismic response to the source seismic signal in the form of a band-limited spike.

One of the assumptions frequently made in the acquisition and processing of seismic data is that, in addition to additive noise, the primary contributors to undesirable variations seen on seismic records are surface-consistent in nature. Examples of surface-consistent effects include source strength and coupling variations, detector plant variations, reverberations, and scattering from inhomogeneities.

One surface consistent convolutional model is:

$$\begin{pmatrix} \text{Seismic} \\ \text{Trace} \end{pmatrix} = \begin{pmatrix} \text{Source} \\ \text{Wavelet} \end{pmatrix} * \begin{pmatrix} \text{Common Midpoint} \\ \text{Reflectivity} \\ \text{Including Offset} \\ \text{Dependence} \end{pmatrix} * \begin{pmatrix} \text{Receiver} \\ \text{Wavelet} \end{pmatrix} + \text{Noise} \quad (1)$$

where * represents convulution.

In this surface consistent convolutional model, it is assumed that the source wavelet accounts for local effects around the source location and variations in the source signal. Similarly, the receiver wavelet accounts for local effects related to the receiver location and variations in receivers. In addition, the assumptions of this model ignore the effects of offset dependence on reflection amplitude.

It is also assumed from the model that if noise can be removed from the seismic trace and the convolution effects of the source wavelet, receiver wavelet and offset dependence are removed by deconvolution, a more accurate indication can be obtained of the common midpoint reflectivity, i.e. the reflection signal from the subsurface boundary halfway between the source and the receiver.

Numerous attempts have been made to use this surface consistent model for deconvolution, including that described in "Surface Consistent Deconvolution", (Taner and Coburn, 1981), Seismic Data Processing, by Ozdogan Yilmaz, The Society of Exploration Geophysics, 1987, pp. 506.

The Taner and Coburn method does not account for the effect of noise on the seismic trace. Even if noise could be accounted for in a variation of the Taner and Coburn method, a separate solution is required for the deconvolution of each seismic trace; no attempt is made by this method to use the redundancy available in a seismic survey which has multiple source and multiple receiver locations. Similar shortcomings can be found in the other methods, in particular, separate deconvolution filters must be derived for each trace.

SUMMARY OF THE INVENTION

A method for surface-consistent adaptive minimum-phase deconvolution is provided which uses the redundancy of a seismic survey to reduce the effect of noise in a surface-consistent convolutional model and to reduce the number of deconvolution filters necessary to deconvolve the seismic survey.

The method of this invention determines the source wavelet associated with each source location and the receiver wavelet associated with each receiver location. It then determines deconvolution filters which will remove the effects of the source wavelet and the receiver wavelet from each trace.

One preferred embodiment of the invention determines the surface consistent source wavelets and receiver wavelets on traces and deconvolves the seismic traces in the following manner. A plurality of source-pairs and receiver-pairs are selected from a seismic survey. Associated with each designated source-pair is a set of traces, the traces having been produced by the two source locations making up the source-pair set. Associated with each designated receiver-pair is a set of traces, the traces having been received by the two receiver locations making up the receiver-pair set.

Cross-correlations are performed on the traces in each source-pair which have common receivers to provide a source-pair cross-correlation signal for each common receiver. Cross-correlations are performed on the traces in each receiver-pair which have common sources to provide a receiver-pair cross-correlation signal for each common source. The cross-correlation signals of the common receivers from each source-pair and the common sources from each receiver-pair are then stacked to provide stacked cross-correlation signals.

The stacked cross-correlation signals are then solved using a surface-consistent convolutional model to determine the amplitude spectrum of the source location wavelet or the receiver location wavelet within a user specified signal band for each source location included in at least one source-pair and each receiver location included in at least one receiver-pair.

In this embodiment, the amplitude spectra may then be edited by frequency filtering parameters. Amplitude spectrum editing may also include approximating the spectra at frequencies outside of the specified signal band. Frequency filtering then blends the amplitude of the approximated spectra with the spectra within the signal band using user specified tapering functions.

A minimum-phase wavelet spectrum is determined from each amplitude spectrum or edited amplitude spectrum (if amplitude spectrum editing is used) using the discrete Hilbert transform to provide a complex spectrum consisting of both amplitude and phase. Individual two-sided finite-length deconvolution filters for each source and receiver location are then determined to remove the source wavelet or the receiver wavelet by using the minimum-phase wavelet spectrum as the input to a Levinson-Wiener inversion technique. The source and receiver location deconvolution filters obtained from the Levinson-Wiener inversion technique are filters which are to be convolved together in the processing of their respective trace.

Deconvolution of each trace is then obtained by selecting the appropriate source location filter (the filter which applies to the source wavelet) and the appropriate receiver location filter (the filter which applies to the receiver wavelet) and convolving the filters together with the appropriate trace to remove the effects of the convolution of surface-consistent effects on the trace and also to provide a trace having wavelets in the form of a band-limited spike.

The use of stacked cross-correlations minimizes the effect of static time shifts and random noise on the signals and allows for the redundance in a seismic survey to be used to reduce the number of deconvolution filters necessary to deconvolve a seismic survey.

Embodiments of this invention have the ability to combine different types of sources and receivers in a single seismic survey. Each source region consists of a continuous series of shot locations using the same type of source (deep dynamite, shallow dynamite, Vibroseis, etc.) and each receiver region consists of a continuous series of receiver locations using the same type of receivers (geophone, hydrophone, etc.). Separate amplitude spectrum editing parameters may be specified for each source region and each receiver region. This allows for the direct deconvolution of mixed dynamite/Vibroseis lines in a single pass, since each type of source can be edited, for example, with an appropriate low-frequency slope.

An additional embodiment of the invention allows for the blanking of portions of traces which have had noise on the traces boosted by the use of the deconvolution filters determined by this method.

These and other objects and advantages of the present invention will become apparent to those of skill in the art after having read the following detailed description of the preferred embodiments which are contained herein and illustrated by various figures.

This invention encompasses the heretofore described embodiments as well as other embodiments as are described hereinafter and as will be apparent to those of skill in the art.

DESCRIPTION OF EMBODIMENTS

Figure 1:
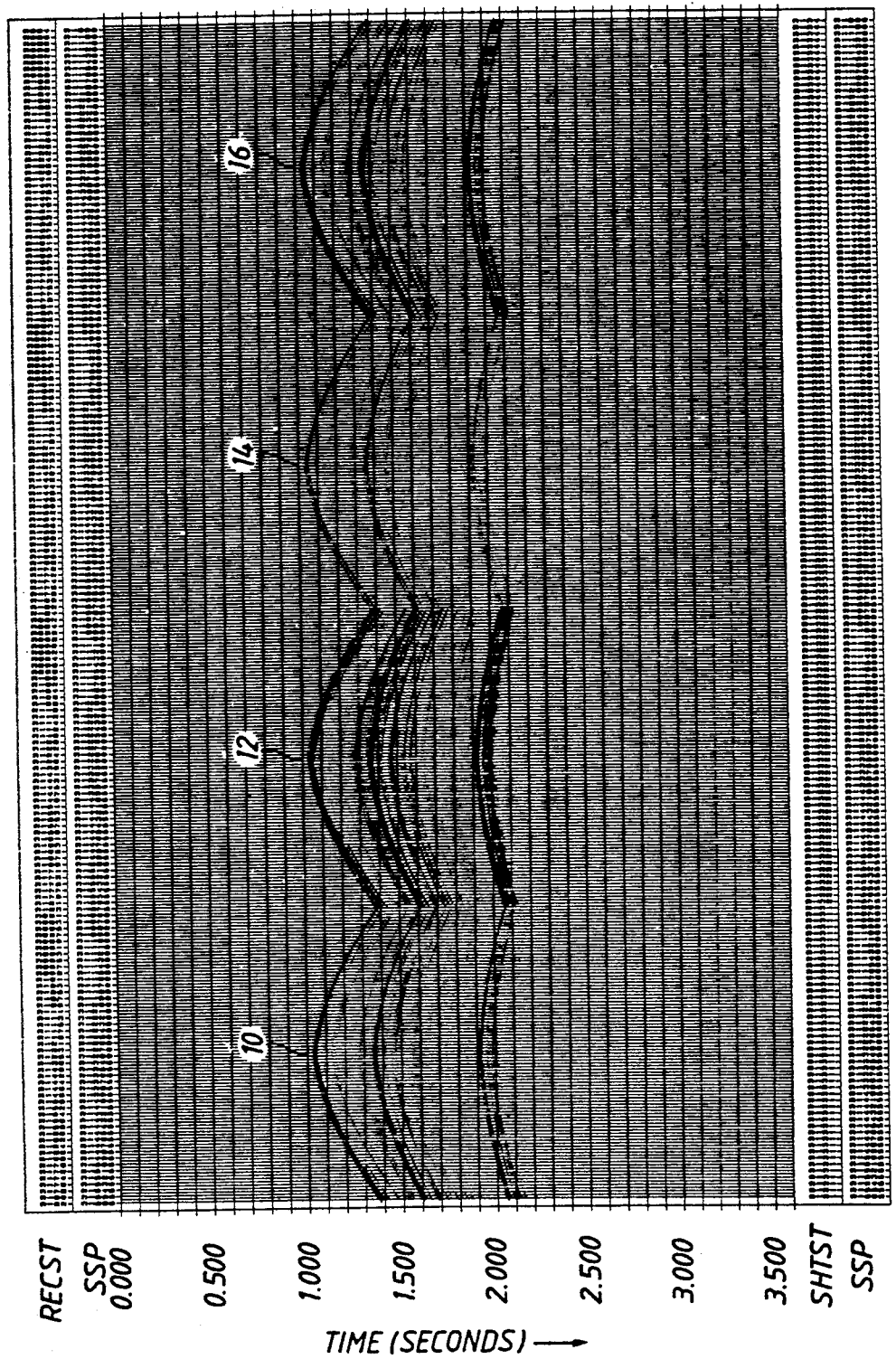
FIG. 1 is an undeconvolved panel of synthetic traces in common-shot gathers.

The embodiments of this invention will be described in relation to sources and geophone receivers used for surface acquisition of seismic data. However, these embodiments can be applied to any seismic acquisition method including the use of sources and hydrophones used in water acquisition techniques.

The method of this invention is based upon a surface-consistent convolutional model which determines the amplitude spectrum of a source wavelet associated with each source location and the amplitude spectrum of a receiver wavelet associated with each receiver location. After the amplitude spectra are determined, deconvolution filters may be derived for each source location and each receiver location to remove the effects of source wavelets and receiver wavelets on each trace by deconvolution. The surface-consistent convolutional model will first be explained. The theory of the method of this invention will then be shown with preferred embodiments. Finally, the steps in an embodiment of the invention and an illustrative example will be provided.

The Surface-Consistent Convolutional Model

In the surface-consistent convolutional model, the near-surface at every location is treated as a unique wavelet that modifies the amplitude and phase of the seismic waves at that location. For example, a shot will have a signature which depends not only upon the physical characteristics of the source but also on the fact that the wave has propagated down through a particular near-surface region. Similarly, the receiver side of the system imparts a signature to the seismic signal depending on the near-surface region at its location as well as the coupling of the receiver to the ground. Thus, the seismic trace will have been distorted by two near-surface wavelets. If we assume that reflectivity varies slowly with midpoint, it is possible to write the general surface-consistent convolutional model for a seismic trace, $T_{ij}(t)$, with source location (location) i and receiver location (location) j, as $$T_{ij}(t) = S_i(t) * E_{\frac{i+j}{2}}(t) * M_{i-j}(t) * G_j(t) + N_{ij}(t). \qquad (2)$$

where the asterisks indicate convolution. In this model, $S_i(t)$ is the source wavelet associated with location i which accounts for variation in source strength, coupling, and character as well as ghosts, reverberations, and any scattering from inhomogeneities in the near-surface which act in a convolutional manner. Similarly, $G_j(t)$ is the receiver wavelet associated with location, location j which accounts for variations in detector character, plant, and array response as well as ghosts and effects due to near-surface variation. E(t) is the earth function associated with the deep subsurface reflection point between the source and the receiver. Knowledge of the earth function is the desired output of the analysis of seismic data. $M_{i-j}(t)$ is an operator representative of effects which depend only upon offset, for example, normal moveout. $N_{ij}(t)$ represents the additive random noise present on the data.

The method is based upon a frequency-domain representation of the surface-consistent convolutional model given in Equation (2). If we ignore offset-dependent effects, the convolutional model for a seismic trace can be written in the frequency domain as $$T_{ij}(f) = S_i(f) \cdot E_{\frac{i+j}{2}}(f) \cdot G_j(f) + N_{ij}(f). \qquad (3)$$

where f is frequency. Note that since this model ignores offset-dependent effects, it does not correct for the offset dependence of reflection amplitudes or the systematic variation of the earth function due to normal moveout reflector convergence.

The method of this invention assumes that the input data for processing are seismic traces indexed by shot and by receiver location. In addition, the input data should preferably be deterministically deconvolved from any desired source, receiver, and instrument effects. It should also be gained and corrected for spreading in a manner which preserves the surface consistent wavelet variation. For example, FIG. 1 shows a synthetic panel of traces, arranged by common shot panels, there are 96 receiver locations associated with each individual shot 10, 12, 14, and 16. Preferably, prior to the start of this method the shot panels should be processed to normalize the overall amplitude of the traces of each panel and to apply a spherical spreading correction to the data.

This method makes signal estimates from source-pairs and receiver-pairs using cross-correlation techniques.

The data used in the cross-correlation are selected by specifying cross-correlation parameters. The method of the invention does not require that a dynamic normal moveout (NMO) correction be performed on the data within the cross-correlation parameters, and, preferably, none should be performed on any data prior to the start of this process. Not performing a dynamic NMO correction preserves the wavelet spectra by avoiding stretch effects. (However, it imposes limits on the distance over which designated pairs of data can be cross correlated which will be discussed hereinafter).

Figure 2:
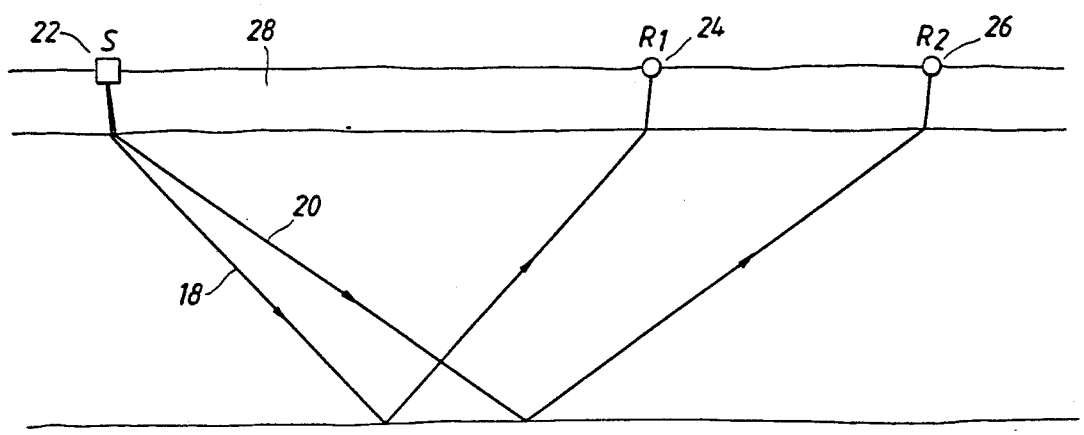
FIG. 2 is a ray-path diagram showing two receivers having a common source.
Figure 3:
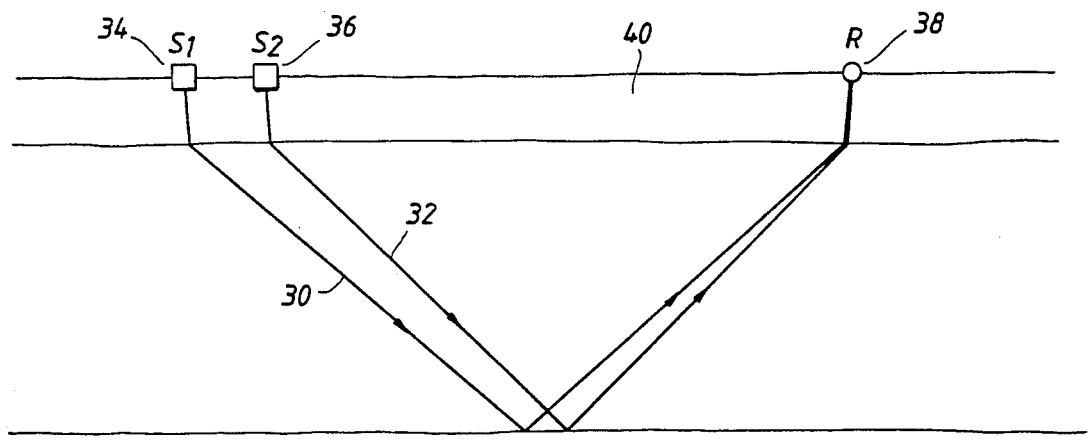
FIG. 3 is a ray-path diagram showing two sources having a common receiver.

The basis for using source-pairs and receiver-pairs to obtain the signal estimates can be seen in FIGS. 2 and 3. The surface-consistent convolutional model assumes that the same source wavelet will be imparted on signals traveling from a single source location to separate receivers. Similarly, a single receiver location will impart the same receiver wavelet on signals received from separate sources.

FIG. 2 is a ray-path diagram of seismic signals 18, 20 traveling from a single source 22 to separate receivers 24 and 26. Using the surface-consistent convolutional model, FIG. 2 illustrates the assumption that the same source signature will be imparted to signal 24 and 26. This assumption is true to the extent that all source signals from a given source follow nearly vertical paths in the near-surface region because the velocity of the near-surface layer is typically slow compared to deeper layers of the earth. The ray paths in the near-surface region are nearly vertical, and rays with a wide range of offsets, such as signals 18, 20, follow nearly the same path in this source near-surface region. The greater the velocity contrast between the near-surface layer 28 and the consolidated sediments below it, the more nearly vertical the ray-paths are, and the better the approximation that the near earth region impacts the same source wavelet upon the source signal.

FIG. 3 is a ray-path diagram of seismic signals 30, 32 traveling from two separate sources 34, 36 to a common receiver 38. FIG. 3 shows that an assumption that the same receiver wavelet will be impacted on signals 30 and 32 when detected by a common receiver 38 due to the low velocity of near-surface region 40 is also true for common receivers as discussed heretofore.

The method of the invention, as mentioned previously, uses data from traces within user defined cross-correlation parameters. The cross-correlations are performed on traces from the same designated source-pair, which have a common receiver to both source locations. All traces associated with a designated source-pair do not have to be cross-correlated to obtain a set of source-pair cross-correlation signals. In particular, traces which may be excluded are those which have high noise levels or those traces which are located far from the source-pair. Preferably, a plurality of traces which belong to a designated source-pair are cross-correlated to obtain a set of source-pair cross-correlation signals.

The source-pair cross-correlation signals are then stacked to obtain a stacked source-pair cross-correlation signal. A similar stacked cross-correlation signal is obtained from each designated receiver-pair. Again, all traces associated with a designated receiver-pair do not have to be included in the cross-correlations to obtain a set of cross-correlation signals.

Figure 4:
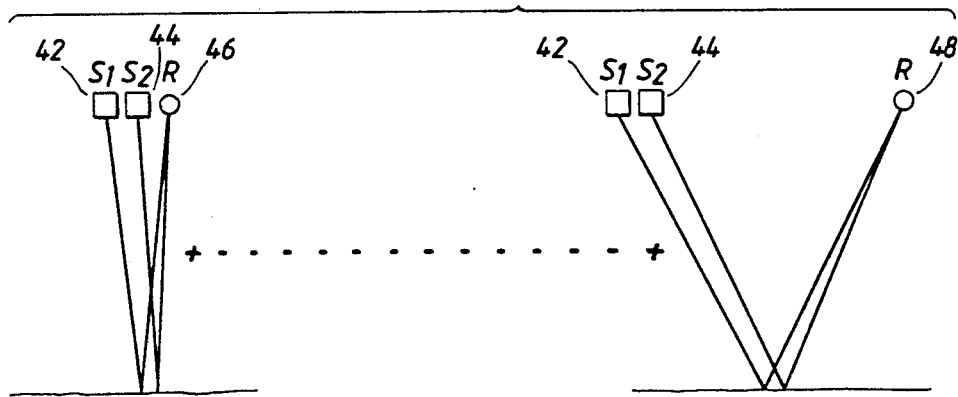
FIG. 4 is a ray-path diagram showing traces associated with a source-pair.

FIG. 4 illustrates how a set of source-pair cross-correlation signals is obtained. In FIG. 4, the designated source-pair are source locations 42 and 44. A ray-path diagram is shown where source locations supply signals to produce two traces on receiver location 46. Portions of traces within the specified cross-correlation parameters of these two traces are cross-correlated since there is a receiver in common to provide a source-pair cross-correlation signal. This process is repeated for other receiver locations on the seismic survey which have detected traces from the same two designated sources such as receiver location 48.

Figure 5:
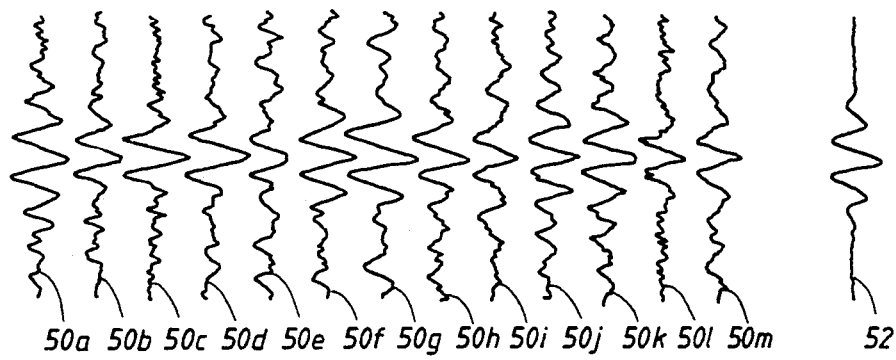
FIG. 5 is an illustration showing the stacking of the cross-correlation signals from the source-pair of FIG. 4.

FIG. 5 shows individual source-pair cross-correlations (50(a) through 50(m)) which were obtained from the source-pair of FIG. 4. The individual cross-correlations are stacked to provide a stacked source-pair cross-correlation signal, 52.

The cross-correlation process and the stacking process minimizes the effects of source and receiver statics and additive noise.

Returning to the development of formulas to explain the method of this invention, this method, preferably, stacks the cross-correlations of all traces from two adjacent sources or nearby sources which have common receivers that are within a user-specified offset range. The stacked cross-correlation $C_{i,i+q}$ between sources at locations i and i+q, i.e. the designated source pair, is $$C_{i,i+q} = \frac{1}{N} \sum_j T_{i,j}(f) \, T_{i+q,j}^*(f) \qquad (4)$$

substituting for $T_{i,j}$ from Equation (3) gives $$C_{i,i+q} = S(f) \, S_{i+q}^*(f) \left( \frac{1}{N} \sum_j E_{\frac{i+j}{2}}(f) \, E_{\frac{i+q+j}{2}}^*(f) |G(f)|^2 \right), \qquad (5)$$

where N is the number of terms stacked and * represents complex conjugation. The $G_j$ term of the stacked cross-correlation signal is representative of an average receiver wavelet, i.e. the average of the receiver wavelets associated with each common receiver in the cross-correlation signals which were used to obtain the stacked cross-correlation signal. It is assumed that the noise is uncorrelated and therefore does not survive the cross-correlation and stacking process.

Redundancy of the estimation of a source or receiver wavelet is achieved by using nearest neighbors, next nearest neighbors, and so on. The index q typically ranges from one up to the three nearest neighbors. For example, if q=1, stacked cross-correlations between $S_i$ and $S_{i+1}$ and also $S_i$ and $S_{i-1}$ would be produced. If q=2, stacked cross-correlations between $S_i$ and $S_{i+2}$ and $S_i$ and $S_{i-2}$ would additionally be produced, thus providing for additional redundancy in the determination of $S_i$.

Figure 6:
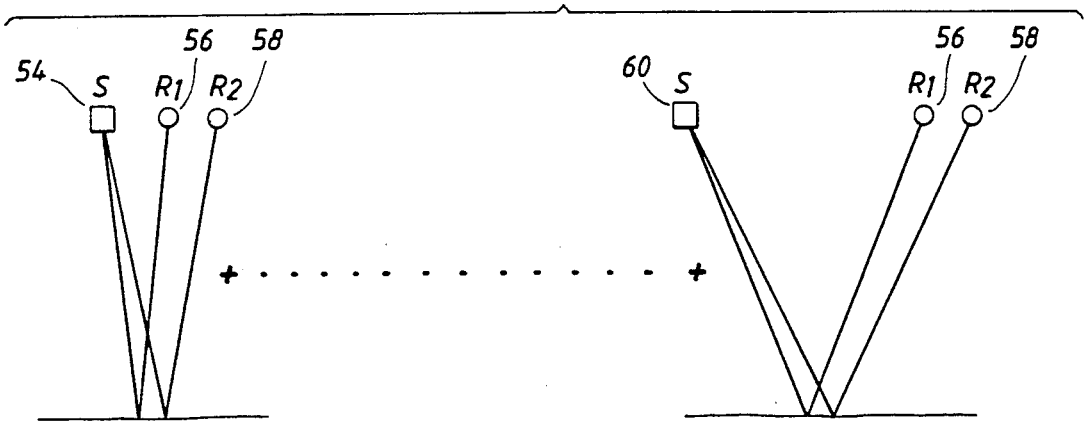
FIG. 6 is a ray-path diagram showing traces associated with a receiver-pair.

Similar stacked cross-correlations are used to estimate a stacked cross-correlation signal from a receiver-pair as shown in FIG. 6 were a common source location 54 is initially used to obtain a receiver-pair cross-correlation from receiver-pair locations 56 and 58. Common source location 60 is also shown providing traces to receiver-pair locations 56 and 58 to obtain another receiver-pair cross-correlation.

The method of the invention provides for the selection of cross-correlation parameters. Various methods are available for the identification of cross-correlation parameters as is known in the art. Two preferred embodiments are described herein, although other methods may be used.

Figure 7A:
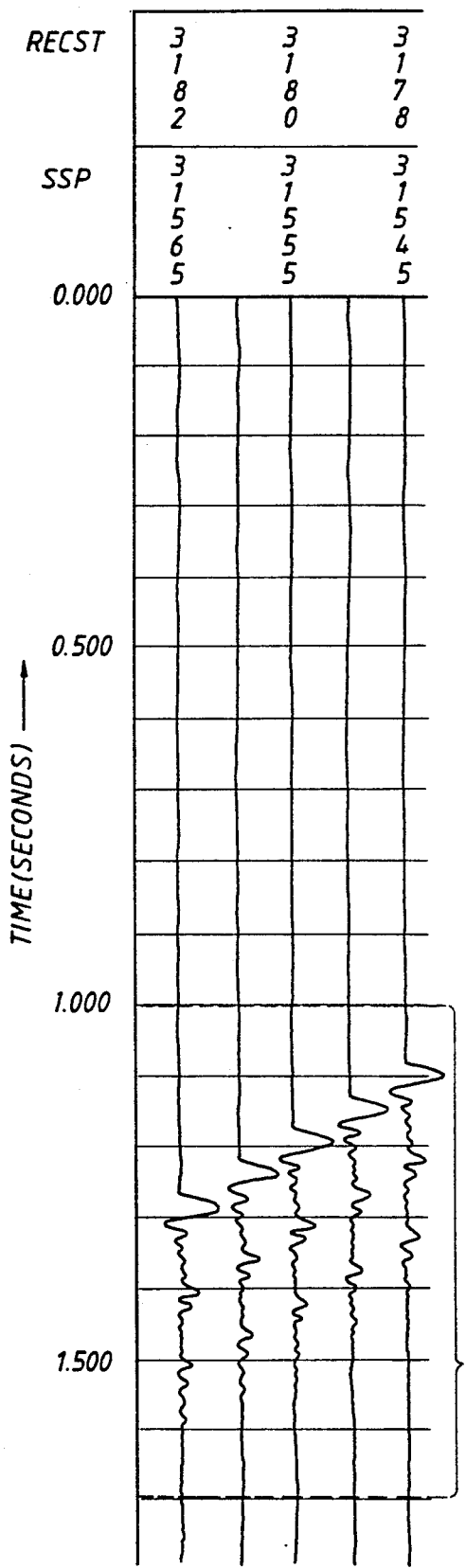
FIG. 7A is an enlargement of a portion of FIG. 1 illustrating the placement of a data gate on a panel of traces by locating the center of the data gate at a specific time from zero.
Figure 7B:
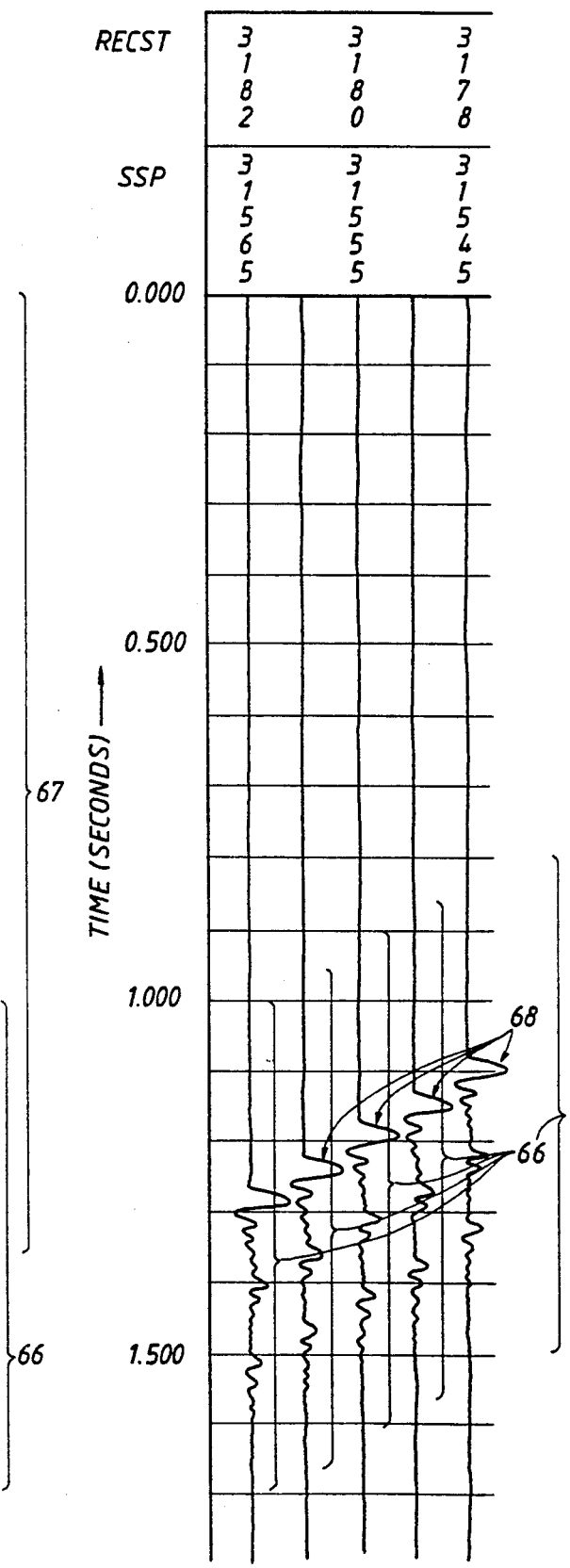
FIG. 7B is an enlargement of a portion of FIG. 1 illustrating the placement of a data gate on a panel of traces so that a feature of interest remains in the same relative position in the data gate.

In both embodiments, a moveout velocity for the data within the data gate, cross-correlation length, and data gate length are selected. The two preferred embodiments differ in how the data gate is located over each trace in a panel of traces. FIGS. 7A and 7B are enlargements of portions of traces from FIG. 1 and show the location of the data gate by the two preferred embodiments.

In FIG. 7A the data gate 66 is shown located over the panel of traces by specifying a time from zero 67 for the location of the center point of the data gate.

In FIG. 7B the data gate 66 undergoes a static time adjustment wherein a designated event 68 within the data gate remains in the same relative position in the data gate from trace to trace.

The length of the data gate and the signal to noise ratio determine the number of nearest neighbors used to obtain redundancy in the estimation of a receiver wavelet or a source wavelet. The designated combinations of source wavelets in a source-pair and designated combinations of receiver wavelets in a receiver-pair, preferably should be in proximity to each other.

Preferably, the data gate 66 and the cross-correlation length need to be long enough to adequately sample the frequency range of interest. However, the data gate should not be too long. If the data gate 66 is made too long, differential stretch effects will reduce the quality of the stacked cross-correlations. Data gate lengths of 800 to 1000 milliseconds with cross-correlation lengths of 200 to 300 milliseconds have been found to work well for many sets of data.

In addition, as mentioned, preferably, the designated combinations should be in proximity to each other. Consequently, the number of nearest neighbors on which to perform cross-correlations containing a specific source wavelet in a source-pair or a specific receiver wavelet in a receiver-pair is restrained by noise and the length of the data gate. If the spacing, (for example, the index q of Equation (5) used to designate source-pairs which contain a specific source wavelet) between source or receiver-pairs being cross-correlated becomes too great, the cross-correlation signals will not produce acceptable results due to differential stretch effects. There is a tradeoff between the gate and cross-correlation length on one hand and the number of nearest neighbors on the other hand; the longer the gate, the fewer the number of nearest neighbors that can be used. For data sets with reasonable signal-to-noise ratios and gate lengths of 800–1000 ms, cross-correlating 3 nearest neighbors for redundancy which are less than 6–10 locations apart is often sufficient. If the gate were made shorter, then more nearest neighbors can be used which are further apart.

Returning to the development of the theory of the method of this invention, the stacked source-pair and receiver-pair cross-correlation signals are used to estimate the individual source and receiver wavelet amplitude spectra. Again, the method assumes that the stacked cross-correlation functions, i.e. the stacked signals, fit the surface-consistent convolutional model. The model tries to solve for the set of functions {S} and {G} that satisfy the surface-consistent convolutional equations over the whole data set. It assumes that lateral variations in geology (represented by E(f)) are small between the midpoints of the two traces being cross-correlated so that $$E_{\frac{i+j}{2}} = E_{\frac{i+q+j}{2}} \qquad (6)$$

and further that the auto-correlation of $E_{i+j/2}$ is independent of lateral position, i.e., $$E_{\frac{i+j}{2}}(f) E_{\frac{i+q+j}{2}}^{*}(f) = E_{\frac{i+j}{2}}^{2}(f) = E^{2}(f). \quad (7)$$

With this assumption, the earth function E can be removed from the summation in Equation (5). The equations for the sources and receivers are now essentially decoupled (only the average receiver remains in the source equations, and only the average source remains in the receiver equations). The equations for the sources are $$S_i(f)S_{i+q}^*(f)E^2(f)G^2(f) = C_{i,i+q}(f), \quad (8)$$

where $G^2(f)$ is the average value of $|G_j(f)|^2$ over all detector locations used in this stack and the equations for the receivers are $$G_j^*(f)G_{j+q}(f)E^2(f)S^2(f) = C_{j,j+q}(f) \quad (9)$$

where $S^2(f)$ is the average value of $|S_i(f)|^2$ over all source locations used in the stack.

Equations (8) and (9) are solved to obtain the amplitude spectrum of the set of functions $\{S\}$ and $\{G\}$. Notice that only the amplitude information is recovered, since the phase information was lost during the cross-correlation process. (During the filter derivation, to be discussed hereinafter, the method calculates the phase information from the amplitude spectrum by making the assumption that the functions $\{S\}$ and $\{G\}$ are minimum phase and computes the phase spectrum from the edited amplitude spectrum using the Hilbert transform.)

The amplitudes of the source wavelets $\{S\}$ and the receiver wavelets $\{G\}$ are given by the equations $$|S_i(f)||S_{i+q}(f)||E(f)|^2G^2(f) = |C_{i,i+q}(f)| \quad (10)$$

and $$|G_j(f)||G_{j+q}(f)||E(f)|^2S^2(f) = |C_{j,j+q}(f)|. \quad (11)$$

For simplicity, the method of this invention assumes a white earth function during the amplitude solution process and then takes the earth function into account later when the filters are derived. Assuming a white earth function yields the following equations:

$$|S_i(f)||S_{i+q}(f)|G^2(f) = |C_{i,i+q}(f)| \quad (12)$$

and $$|G_j(f)||G_{j+q}(f)|S^2(f) = |C_{j,j+q}(f)|. \quad (13)$$

The method of this invention solves this system of equations in either of two ways: in one preferred embodiment it solves the nonlinear Equations (12) and (13) directly as written, or in another preferred embodiment it solves the logarithm of these equations, which is almost a linear system. Each of these embodiments is described hereinafter.

The Surface-Consistent Wavelet Amplitude Solution

In the surface-consistent wavelet amplitude solution, a separate amplitude spectrum is derived for each source and receiver location in either the logarithmic solution or the direct solution.

At the beginning, the surface-consistent amplitude solution is initialized and the input cross-correlation data are scaled to match the scaling of the amplitude solution. This method is designed so that the average amplitude over all frequencies for all sources and all receivers in the solution is 1.0 (for the direct solution) or, equivalent to 0 dB (for the logarithmic solution). This scaling of the cross-correlations is accomplished by calculating the average amplitude over all frequencies for all source and receiver cross-correlations in the solution and then dividing all of the cross-correlations by that average value.

In one preferred embodiment, the initialization of the amplitude solution is accomplished by noting that each cross-correlation function $C_{i,i+q}$ is the product of two source and two receiver wavelets. For example, $$S_i(f)S_{i+q}^*(f)G^2(f) = C_{i,i+q}(f). \quad (14)$$

Therefore, a good initial value for the source and receiver wavelet amplitudes at frequency f is the fourth root of the average of all input cross-correlations at that frequency. This calculation is performed on the scaled cross-correlations, resulting in initial amplitude values clustered near unity.

In another preferred embodiment, the amplitude solution is initialized with values stored in a restart file. This capability allows a user to perform some iterations of the solution, to stop to look at the intermediate results, and then to restart the calculation at the place where it left off.

Both embodiments, i.e. the direct solution and the logarithmic solution, determine the amplitude spectra one frequency at a time within a user specified signal band. The user specifies the frequencies or the number of frequencies (the sampling interval) in the solution of the amplitude spectra. The greater the number of frequencies in the solution the longer it will take to determine a solution.

The surface-consistent amplitude solutions of these embodiments preferably are performed over a range of frequencies below the low-frequency editing point and some frequencies above the high-frequency editing point (to be discussed hereinafter) to improve the quality of the low-frequency and high-frequency slope fits when spectrum editing is used. For example, if the editing frequencies are 10 Hz and 55 Hz, the solution range should be about 7 Hz to 58 Hz.

Logarithmic Solutions

Taking the logarithm of both sides of Equations (14) and (15), we get $$\log|S_i(f)| + \log|S_{i+q}(f)| + \log|G^2(f)| = \log|C_{i,i+q}(f)| \quad (15)$$

and $$\log|G_j(f)| + \log|G_{j+q}(f)| + \log|S^2(f)| = \log|C_{j,j+q}(f)|. \quad (16)$$

Equations (15) and (16) are weakly non-linear and can be solved by various techniques known in the art and for the solution of such equations.

In one preferred embodiment, the coupled set of Equations (17) and (18) are solved independently for each frequency of interest using a conjugate gradient method. The objective function to be minimized by the conjugate gradient method is $$F = \sum_{i,q} (\log|S_i(f)| + \log|S_{i+q}(f)| + \log|G^2(f)| - \quad (17)$$

$$\log|C_{i,i+q}(f)|)^2 + \sum_{j,q} (\log|G_j(f)| + \log|G_{j+q}(f)| +$$

$$\log|S^2(f)| - \log|C_{j,j+q}(f)|)^2.$$

If this embodiment is used to determine the amplitude spectra, the coupled set of Equations (15) and (16) are solved for all $S_i$ and $G_j$. In this case, as discussed previously, the input cross-correlations and the initial values for the amplitude solutions are first scaled so that the average of all source and receiver amplitudes at all frequencies in the solution is 0 dB.

Note that the multiplication of the source wavelet amplitudes {S} by an overall constant and the simultaneous division of the receiver wavelet amplitudes {G} by the same constant does not change Equation (15) or (16). This mathematical ambiguity can introduce long spatial wavelength errors in the wavelet estimation. To control the long-wavelength errors, a penalty function in the solution is introduced which penalizes large departures from the average value which occur over many locations. The actual function used is $$F_{PEN} = \lambda \sum_{i,q} (\log|S_i(f)| + \log|S_{i+q}(f)| - \log|G^2(f)|)^2 + \quad (18)$$

$$\lambda \sum_{j,q} (\log|G_j(f)| + \log|G_{j+q}(f)| - \log|S^2(f)|)^2.$$

Note that this penalty function constrains the difference between the source amplitudes and the average receiver amplitude over the line, and the difference between the receiver amplitudes and the average source amplitudes over the line. Reasonable values for the parameter $\lambda$ in this embodiment allows for free variation of the $S_j$s and $G_j$s over a short range, while suppressing variations which take the form of long trends present in many locations. These objectives are realized in the logarithmic solution for choices of $\lambda$ of between 0.01 and 0.1.

Equations (15) and (16) are weakly nonlinear, since the solution for the source amplitudes depends upon the average of the squares of the solutions for the receiver amplitudes, and vice versa. In this preferred embodiment, the determination of this solution has been linearized by calculating a squared average source and receiver amplitude at the beginning of each iteration based upon the values calculated in the previous iteration and then treating those values as constant for the duration of the iteration.

As stated previously, Equations (15) and (16) in a preferred embodiment are solved independently for each frequency using a conjugate gradient method. The conjugate gradient solution iterates until either the solution converges or a user-specified maximum number of iterations is reached. Convergence occurs when the absolute maximum value of the gradient terms of the objective function falls below a user-specified convergence criterion.

In other embodiments of the logarithmic solution, a weighted least squares objective function may be used in place of equation (17) and/or a weighted least squares penalty function may be used in place of equation (18).

The Direct Solution

In another preferred embodiment which uses the direct solution to determine amplitude spectra, Equations (12) and (13) are solved independently for each frequency using a conjugate gradient method. The objective function to be minimized by the conjugate gradient method is $$F = \sum_{i,q} (|S_i(f)||S_{i+q}(f)| G^2(f) = |C_{i,i+q}(f)|)^2 + \quad (19)$$

$$\sum_{j,q} (|G_j(f)||G_{j+q}(f)| S^2(f) - |C_{j,j+q}(f)|)^2$$

If the method of this invention is run in the direct solution embodiment, the coupled set of Equations (12) and (13) are solved directly for all $S_i$ and $G_j$. In this case, as discussed previously, the input cross-correlations and the initial values for the amplitude solutions are first scaled so that the average amplitude over all sources and receivers at all frequencies included in the solution is equal to unity.

As in the logarithmic solution, the multiplication of the source wavelet amplitudes {S} by an overall constant and the simultaneous division of the receiver wavelets {G} by the same constant does not change Equation (12) and (13), so serious long-wavelength errors are possible in the solutions for {S} and {G}. To control the long-wavelength errors, a penalty function $F_{PEN}$ is preferably added to the objective function being minimized.

Since the input cross-correlations and the initial values for the amplitude solutions are scaled so that the average of all source and receiver amplitudes at all frequencies in the solution is unity, an appropriate penalty function to control the long-wavelength errors in the solution is one which penalizes long-wavelength amplitude departures from unity while not affecting the short-wavelength variations. This effect is achieved by using a penalty function of the form $$F_{PEN} = \quad (20)$$

$$\lambda \sum_i (\text{Smoothed } S_i(f) - 1.0)^2 + \lambda \sum_j (\text{Smoothed } G_j(f) - 1.0)^2.$$

Spatial wavelengths shorter than the smoothing length are averaged out during the smoothing operation, so they are not penalized by function $F_{PEN}$. Long spatial wavelengths survive the averaging process, and so are penalized in the solution.

The smoothing operation in this penalty function is accomplished by convolving the source amplitudes $S_i$ and the receiver amplitudes $G_j$ with rectangular windowing functions. The one-sided length of the smoothing operator in this embodiment as an example, is 50 locations so, basically, wavelengths shorter than 50 locations in this example are not penalized in the solution. A value of 0.1 for the weighing parameter $\lambda$ typically provides good results in the solution of the direct equations.

As stated previously in this preferred embodiment, Equations (12) and (13) are solved independently for each frequency using a conjugate gradient method. The conjugate gradient solution iterates until either the solution converges or a user-specified maximum number of iterations is reached. Convergence occurs when the absolute maximum value of the gradient terms of the objective function falls below a user-specified convergence criterion.

Although the direct solution embodiment is slower than the logarithmic solution, the direct solution is advantageous in low signal-to-noise environments, since the logarithmic solution tends to weigh noisy data more heavily than the direct solution does.

Frequency Smoothing

In certain embodiments of the invention, a completely separate amplitude solution is performed for each frequency of interest. Because the solutions are completely separate, there is no intrinsic reason that the amplitudes of adjacent frequencies at a given source or receiver location should change smoothly. If the data of the traces are somewhat noisy, the amplitude solutions for adjacent frequencies at a given location can differ dramatically.

To eliminate this problem in the direct solution and logarithmic embodiments, a second penalty function may be included with the objective function. When enabled, this penalty function is applied during the solutions at each frequency. It penalizes large difference in amplitudes between adjacent frequencies at a given location by comparing the amplitude at the current frequency and location to the average of the amplitudes of the frequencies above and below the current frequency at the same location. The form of the penalty for frequency f is $$F_{PEN} = \gamma \sum_i \left( S_i(f) - \left( \frac{S_i(f+1) + S_i(f-1)}{2} \right) \right)^2 + \gamma \sum_j \left( G_j(f) - \left( \frac{G_j(f+1) + G_j(f-1)}{2} \right) \right)^2. \quad (21)$$

The possible range for the penalty weight $\gamma$ is 0.0 to 1.0. Preferably a small weight is used during early iterations and progressively higher weights are used during later iterations. For example, at each frequency one might do 30 iterations with a penalty weight $\gamma$ of 0.1, followed by 30 more iterations with a $\gamma$ of 0.5, and conclude with 30 more iterations with a $\gamma$ of 1.0. In the terminology of this particular embodiment, each set of iterations with a constant $\gamma$ is known as a frequency stability cycle; up to six frequency stability cycles may be specified in a single run in this embodiment with different values for $\gamma$.

Amplitude Spectrum Editing

After the amplitude spectrum for each source and receiver wavelet are determined by the surface-consistent convolutional model equations, the spectra may be edited to tailor them to the characteristics of specific source or receiver regions. This independent editing capability permits a user to mix different types of sources and receivers in a single seismic survey. For example, suppose that a survey consists of mixed dynamite and vibroseis sources. It is possible in the method of this invention to specify that the dynamite data is to be edited one way and the vibroseis data is to be edited another.

A white earth function was initially assumed in determining the wavelet spectra up to this point. If the user of this method now specifies a known earth function, the square-root of that function may now be divided out of each source and receiver spectrum as a part of the editing process.

Editing can be performed on the spectra by frequency filtering. Frequency filtering may include the use of a tapering function to tailor the low and high frequency amplitudes in each amplitude spectrum so that the amplitude spectrum of each wavelet will take on the characteristics of, for example, a wavelet produced by a dynamite source or a vibroseis source.

Further, the editing can be enhanced by approximating the amplitude spectra outside of the specified signal band used to determine each amplitude spectrum before frequency filtering. The amplitude of the approximated spectra are chosen to match the spectra within the bandpass which are in proximity to the frequency editing point for that portion of the spectra. A tapering function is preferably used to blend the transition between the approximated and unedited spectra during frequency filtering.

In one preferred embodiment the frequency filtering takes the form of a band-pass filter having the following user defined parameters: $-6$ dB low-frequency point, 0 dB low-frequency point (also called the low-frequency editing point), low-frequency slope in dB per octave, high frequency 0 dB point (also called the high-frequency editing point), high-frequency $-6$ dB point, and high frequency slope in dB per octave.

In this embodiment approximated amplitude spectra are also added to the initial amplitude spectrum during editing.

Figure 8:
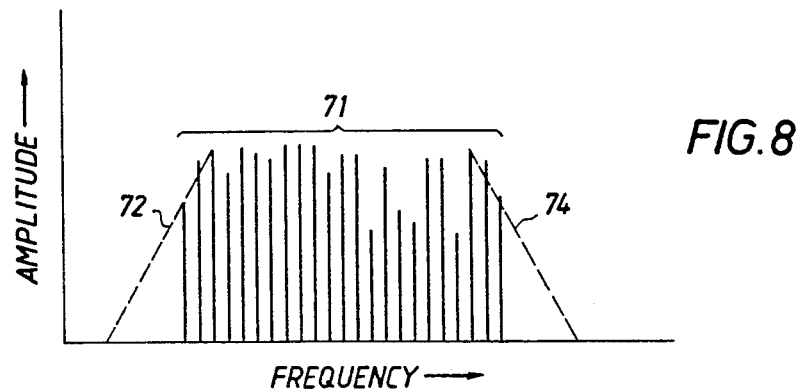
FIG. 8 is an illustration of an amplitude spectrum determined by an embodiment of this method.

FIG. 8 is an illustration of a typical source or receiver amplitude spectrum 70 prior to spectrum editing according to this embodiment. Additional spectra are to be added to this spectrum on both sides of the signal band 71. Line 72 and 74 indicate editing slopes or tapering functions. These editing slopes are the same as the low-frequency and high-frequency slopes specified in the parameters for the edited amplitude spectrum of this preferred embodiment. Spectrum editing for the region outside of the bandpass (i.e., the specified signal band) is done by approximating the spectra outside of the bandpass and adding it to the amplitude spectrum. The editing of the amplitude spectrum includes blending the amplitude of the approximated spectra with the amplitude of the spectra within the bandpass along editing slopes 72 and 74.

In this particular embodiment, it is preferred that the high- and low-frequency editing points be the same for all regions, but the editing slopes may be chosen independently for each region. For example, in this embodiment, it is possible to specify that for dynamite data the low-frequency editing slope will be 12 dB/octave, while the low frequency editing slope for the vibroseis data will be 0 dB/octave.

In another embodiment of this method, an average source wavelet spectrum is determined for each source region. And, an average receiver wavelet spectrum is determined for each receiver region. These spectra are then edited so that they may be used in the event that no viable solution is derived for a source location or a receiver location.

After amplitude spectrum editing, a minimum-phase wavelet spectrum is computed from each individual source and receiver amplitude spectrum. A preferred embodiment uses the discrete Hilbert transform as is known in the art to provide a complex spectrum consisting of both amplitude and phase from the amplitude spectrum.

It should be noted that, amplitude editing may be bypassed in this method. For example, if different source regions or receiver regions are not present in the seismic survey and the user has specified a wide signal band, a minimum-phase wavelet spectrum may be computed after the amplitude spectra are determined from the surface-consistent convolutional equations.

Filter Derivation

Deconvolution filters which will remove the source wavelet and the receiver wavelet can now be determined for each source (source location) and receiver (receiver location) since the source and receiver wavelets are now in the form of a complex spectrum.

The method of this invention determines a deconvolution filter for each source wavelet and for each receiver wavelet. Each filter is designed to work in conjunction with a second deconvolution filter.

In a preferred embodiment, a Levinson-Wiener inversion is used to obtain two-sided, finite length time-domain deconvolution filters for each source wavelet or receiver wavelet. In addition, the Levinson-Wiener deconvolution technique can also be used to insure the deconvolution filters provide, as an output, wavelets in the form of a band-limited spike after the source and receiver wavelets are removed. The Levinson-Wiener inversion process is well known by practitioners of the art to derive deconvolution filters having specific output characteristics when the input characteristics to the deconvolution filter is known and will not be discussed herein.

In another preferred embodiment, an average filter for each source and receiver region is derived from the average spectrum associated with that region. The average filters are used at locations where for some reason no filter is derived.

Deconvolution

After the deconvolution filters are derived, the trace which is indexed by source and receiver location is then convolved with its respective source and receiver deconvolution filters.

In another preferred embodiment a step has been added to blank portions of traces which have excessive noise as a result of the application of the deconvolution filters of this method.

The application of the deconvolution filters may sometimes boost high-frequency noise deep within a seismic survey being processed. This may occur because the deconvolution filters are derived using a shallow data gate where the signal-to-noise ratio is high and the surface-consistent effects can be easily estimated, but these deconvolution filters are applied to the whole trace. At shallow depths, the returned signal from the earth dominates over instrument noise, and an accurate spectral estimate is made and used to derive the deconvolution filters. At greater depths, the situation is different. Spherical spreading and absorption cause the signal to be attenuated rapidly with depth, and noise may dominate the desired signal at some receivers. In that situation, the deconvolution filters may simply wind up boosting the undesired noise. At times, the noise may be large enough to contaminate even stacked data.

To correct this problem, this particular preferred embodiment optionally blanks excessively strong traces. If blanking is enabled, this embodiment forms panels of traces after applying the deconvolution filters. Each trace (designated as l) is divided into m gates, i.e. portions (sections) of traces, (preferably not more than 20), and the rms energy $P_{lm}$ in each gate is calculated. For each gate in each trace, this embodiment calculates the average rms energy in that gate for the N surrounding traces, where N is a user-specified number:

$$P_{lm} = \sum_{k=1-\frac{N}{2}}^{1+\frac{N}{2}} P_{km}, \text{ with } k \neq l. \tag{22}$$

If the ratio $P_{lm}/P_{lm}$ exceeds a user-specified threshold, then gate m of trace l is blanked. When a gate is blanked, a Hanning taper may be applied at the edges of the blanked region.

Steps In A Preferred Embodiment And An Illustrative Example

FIG. 1 shows one part of a synthetic data set of common-shot gathers generated to test this method. FIG. 1 illustrates 4 shots with 96 receivers per shot in a symmetrical split-shot configuration. In the synthetic data used, source and receiver amplitudes, ghosts, and reverberations were varied randomly about their normal values in a source-consistent manner.

The advantage of treating the data as represented in FIG. 1 in a surface-consistent manner is that the number of parameters necessary to describe the effects of shot strength and coupling variations, geophone plant variations, reverberations, and scattering from inhomogeneities is reduced, and the full redundancy of the measured seismic data may be better used for their estimation.

The data represented by FIG. 1 is a part of a seismic survey having 100 shots with 96 receivers per shot. This seismic survey represents 100 shot locations and 196 receiver locations (one receiver location being added for each additional shot location after the first shot). To remove the variations without taking advantage of surface consistency, it is necessary to calculate 9600 separate deconvolution filters (100 shots with 96 receivers per shot), and each filter must be derived from single-trace data with low signal-to-noise ratio. On the other hand, in order to apply the method of this invention, which takes advantage of surface consistency, it is necessary to determine only 100 source and 196 receiver deconvolution filters. In addition, there are up to 96 traces available to contribute to the solution of each source deconvolution filter, and a similar large number of traces available to derive each receiver deconvolution filter. With such a larger number of available traces, the signal-to-noise ratio of the stacked cross-correlations will be higher than normally available to derive a single deconvolutional filter for each trace.

Figure 9:
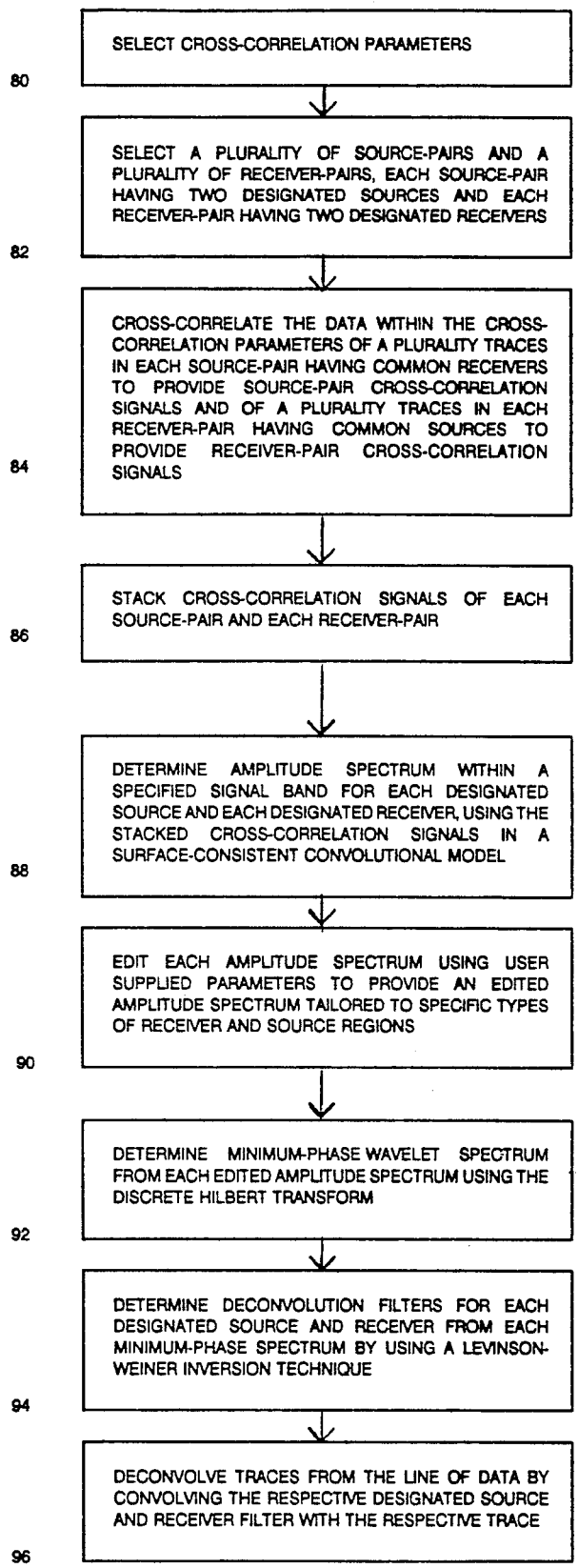
FIG. 9 is a block diagram of the steps in an embodiment of this invention.

FIG. 9 is a block diagram of the steps in one preferred embodiment of this method. It is assumed that prior to the start of this method that the data (traces) have been indexed according to shot location and receiver location. In addition, preferably, the data has been deterministically deconvolved for any desired source, receiver, and instrument effects. Preferably, it is also gained and corrected for spreading in a manner which preserves surface consistent wavelet variation. Deabsorption may also be applied to the data. However, it is preferable the data not be dynamically NMO (normal moveout) corrected.

In FIG. 9, the first step 80, of one preferred embodiment is to select cross-correlation parameters such that the cross-correlation parameters will include wavelets from the traces to be used in this method which contain the source wavelet and the receiver wavelet.

The next step 82 is to select a plurality of source-pairs and receiver-pairs from the seismic survey. Each source-pair is made up of traces which are produced from two different source locations. Each receiver-pair is made up of traces which were received from two different receiver locations. A source location included in at least one source-pair having one receiver location in common with at least one trace from the other source location is a designated source location. A receiver location included in at least one receiver-pair having at least one source location in common with at least one trace from the other receiver location is a designated receiver location.

All traces associated with either of the two source (shot) locations in a source-pair do not have to be included in the selection of source-pair traces. Preferably, in this embodiment, the traces with the highest signal to noise ratio which are the closest to the source locations are selected.

A similar criteria applies to the receiver locations. All traces associated with either of the two receiver locations in a receiver-pair do not have to be included in the selection of receiver-pair traces. Preferably, in this embodiment, the traces with the highest signal to noise ratio which are the closest to the receiver locations are selected.

In some embodiments of this invention when the determination of a source or receiver wavelet is not possible by this process or the source location or receiver location is not a designated source or receiver location, an average source wavelet or receiver wavelet is determined for that source location or receiver location.

The data within the cross-correlation parameters (i.e., the portion of each trace containing the source wavelets and the receiver wavelets) are cross-correlated, on a plurality of traces associated with each source-pair that have common receivers to provide a source-pair cross-correlation signal for each common receiver location and on a plurality traces associated with each receiver-pair that have common sources to provide a receiver-pair cross-correlation signal for each common source location, step 84.

The cross-correlation signals from each source-pair are stacked to produce a stacked source-pair cross-correlation signal and the cross-correlation signals from each receiver-pair are stacked to produce a stacked receiver-pair cross-correlation signal, step 86.

It should be noted, that the previous steps 82 through 86 can be varied depending upon the specific requirements or limitations of equipment of a practitioner of this method. For example, after a source-pair is designated, the cross-correlation signals may be derived and the stacked cross-correlation signal for the source-pair determined. The method may then in the same manner designate the next source-pair or receiver-pair and determine the stacked cross-correlation signal of that designated source-pair or receiver-pair.

In step 88, an amplitude spectrum representative of source wavelets or receiver wavelets within a user specified bandpass for frequencies of interest is determined for each designated source location and each designated receiver location by using the stacked cross-correlations in a surface-consistent convolutional model. In this preferred embodiment, a logarithmic solution of the model is used which solves independently for each frequency of interest within the bandpass of each amplitude spectra using a conjugate gradient method.

In another preferred embodiment, amplitude spectra within the specified bandpass are determined in step 88 by a direct solution of the surface-consistent convolutional model which solves for each frequency of interest using a conjugate graduate method.

In step 88 the terminology "frequencies of interest" is used to mean that the practitioner of this method can select the number of frequencies or the increments in the sampling range of frequencies to be solved for. The larger the number of frequencies or the smaller the increments in the sampling range the longer it will take for the method to provide a solution.

After the amplitude spectra within the specified bandpass are determined, the amplitude spectrum of the individual source or receiver wavelets may be edited using user supplied amplitude spectrum editing parameters. In this embodiment, the spectrum editing is done by specifying editing parameters for the low-frequency and high-frequency slopes and the low-frequency and high-frequency editing points. In addition in this embodiment, spectra are approximated outside of the selected signal band. The amplitude of the approximated spectra is blended by the low-frequency and high-frequency editing slopes with the amplitude of the spectra in proximity to the editing frequencies, step 90. This step is used to tailor the amplitude spectrum of the determined amplitude spectra to each source and receiver region so that the method of this invention can be applied to different types of sources and receivers.

A minimum-phase wavelet spectrum, is then determined for the source wavelet of each designated source location and the receiver wavelet of each designated receiver location using the discrete Hilbert transform, step 92.

Deconvolution filters for each designated source location and designated receiver location are determined using each minimum-phase wavelet spectrum as the input to a Levinson-Wiener inversion technique and specifying as an output from the technique a two-sided finite length time-domain deconvolution filter which will remove a specific source wavelet or a specific receiver wavelet and work in conjunction with a second filter to remove a specific source wavelet or receiver wavelet while also providing an output trace having wavelets in the form of a band-limited spike, step 94.

Deconvoluting traces from the seismic survey is then performed by convolving the respective source and receiver deconvolution filter to their respective trace, step 96.

Figure 10:
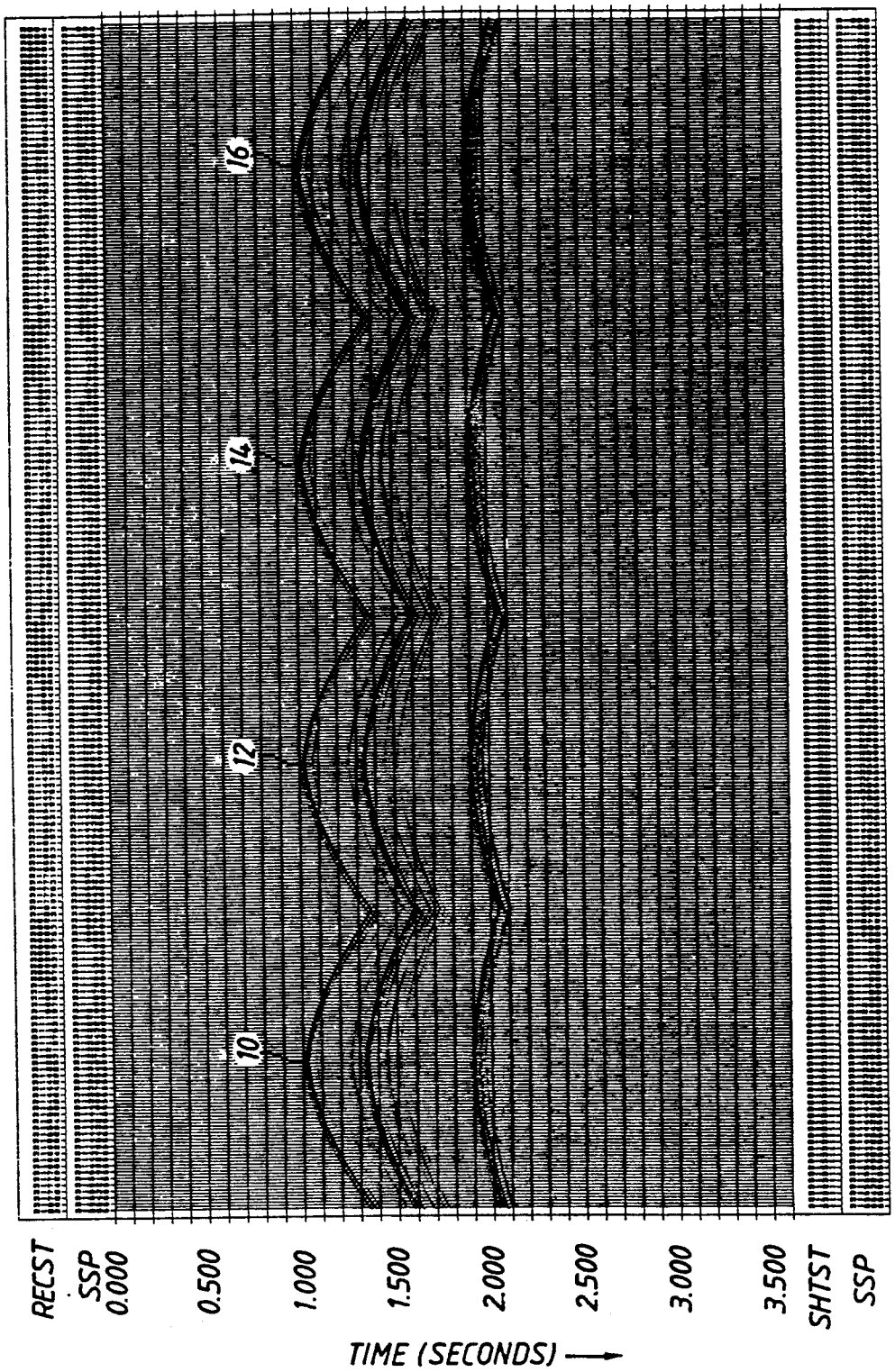
FIG. 10 is the panel of synthetic traces of FIG. 1 after they have undergone deconvolution by an embodiment of this invention.
Figure 11:
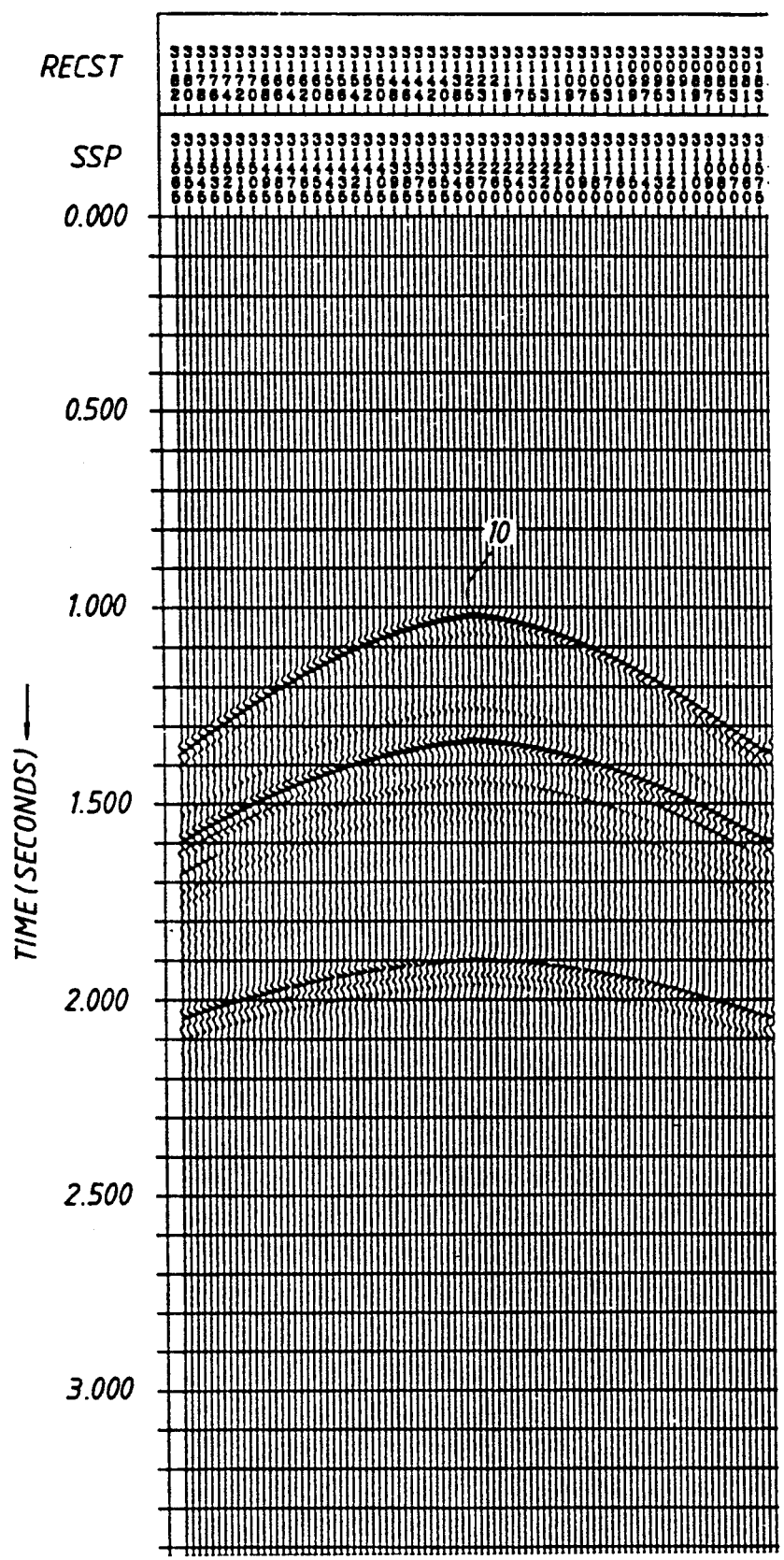
FIG. 11 is an enlargement of a portion of FIG. 10.

FIG. 10 is an illustrative example of traces processed by the method of this invention. FIG. 10 shows the synthetic data set of FIG. 1 after it has undergone deconvolution using the method of this invention. FIG. 11 is an enlarged view of shot 10 from FIG. 10.

Although the present invention has been described in terms of specific embodiments, it is anticipated that alterations and modifications thereof will no doubt become apparent to those of skill in the art. It is therefore intended that the following claims be interpreted as covering all alterations and modifications as fall within the true spirit and scope of this invention.

What is claimed is:

1. A method for processing a seismic survey to obtain an amplitude spectrum of a source wavelet of a source location and a receiver wavelet of a receiver location from traces obtained from the seismic survey, the traces having been acquired by using a plurality of sources and a plurality of receivers, the traces being indexed by source location and by receiver location, each source location having an associated source wavelet which convolves on each trace produced by that source location and each receiver location having an associated receiver wavelet which convolves on each trace received by that receiver location, comprising the steps of:

(a) selecting cross-correlation parameters such that said cross-correlation parameters will include wavelets from the traces which contain the source wavelet and the receiver wavelet;

(b) selecting a plurality of source-pairs and receiver-pairs having indexed source locations and indexed receiver locations from the seismic survey, the traces of each source-pair being selected from source location indexes associated with two designated source locations, each source-pair having at least one trace indexed to one of the two designated source locations which has a common receiver location with at least one other trace of that said source-pair indexed to the second of the two designated source locations, the traces of each receiver-pair being selected from receiver location indexes associated with two designated receiver locations, each receiver-pair including at least one trace indexed to one of the two designated receiver locations which has common source location with at least one other trace of that said receiver-pair indexed to the second of the two designated receiver locations, each said source location being included in at least one source-pair is a designated source location, each said receiver location being included in at least one receiver-pair is a designated receiver location;

(c) cross-correlating portions of the traces within the cross-correlation parameters of each said source-pair having common receivers to provide source-pair cross-correlation signals, a source-pair cross-correlation signal being provided for each said common receiver location, and cross-correlating the portions of the traces within the cross-correlation parameters of each said receiver-pair having common sources to provide a receiver-pair cross-correlation signal, a receiver-pair cross-correlation signal being provided for each said common source location;

(d) stacking the cross-correlation signals of each said receiver-pair and each said source pair to obtain a stacked cross-correlation signal for each said source-pair and each said receiver-pair; and (e) determining the amplitude spectrum for the source wavelet of each said designated source location and the receiver wavelet of each designated receiver location from the stacked cross-correlation signals using a surface-consistent convolutional model.

2. The method of claim 1 wherein step (e) also includes a logarithmic solution of the surface-consistent convolutional model to determine the amplitude spectrum.

3. The method of claim 1 wherein the model of step (e) includes a conjugate gradient technique which determines the amplitude spectrum independently for each frequency of interest.

4. The method of claim 3 wherein step (e) also includes a logarithmic solution of the surface-consistent convolutional model to determine the amplitude spectrum.

5. The method of claim 4 wherein step (e) includes frequency smoothing of each said amplitude spectrum.

6. The method of claim 3 wherein step (e) also includes a direct solution of the surface-consistent convolutional model to determine the amplitude spectrum.

7. The method of claim 6 wherein step (e) includes frequency smoothing of each said amplitude spectrum.

8. The method of claim 1 wherein step (e) determines the amplitude spectrum for the source wavelet of each said designated source location and the receiver wavelet of each said designated receiver location within a specified bandpass.

9. The method of claim 8 also including the steps of:
(f) editing each said amplitude spectrum to obtain an edited amplitude spectrum.

10. The method of claim 9 wherein the editing of said amplitude spectrum includes selecting a low-frequency and a high-frequency editing point, a low-frequency slope and a high-frequency slope in dB/octave for frequency filtering.

11. The method of claim 9 wherein the editing of said amplitude spectrum also includes approximating an amplitude spectra outside of the specified bandpass of each said amplitude spectrum and blending the amplitude of the edited spectra with the spectra within the specified band pass with a tapering function whereby the edited amplitude spectrum of each said receiver wavelet and each said source wavelet are tailored to specific types of sources and receivers.

12. A method of processing a seismic survey to obtain source wavelet deconvolution filters and receiver wavelet deconvolution filters for traces obtained from the seismic survey, the traces having been acquired by using a plurality of sources and a plurality of receivers, the traces being indexed by source location and by receiver location, each source location having an associated source wavelet which convolves on each trace produced by that source location and each receiver location having an associated receiver wavelet which convolves on each trace received by that receiver location, comprising the steps of:

(a) selecting cross-correlation parameters such that said cross-correlation parameters will include wavelets from the traces which contain the source wavelet and the receiver wavelet;

(b) selecting a plurality of source-pairs and receiver-pairs having indexed source locations and indexed receiver locations from the seismic survey, the traces of each source-pair being selected from source location indexes associated with two designated source locations, each source-pair having at least one trace indexed to one of the two designated source locations which has a common receiver location with at least one other trace of that said source-pair indexed to the second of the two designated source locations, the traces of each receiver-pair being selected from receiver-location indexes associated with two designated receiver locations, each receiver-pair including at least one trace indexed to one of the two designated receiver locations which has common source location with at least one other trace of that said receiver-pair indexed to the second of the two designated receiver locations, each said source location being included in at least one source-pair is a designated source location, each said receiver location being included in at least one receiver-pair is a designated receiver location;

(c) cross-correlating the portions of traces within the cross-correlation parameters of each said source-pair having common receivers to provide source-pair cross-correlation signals, a source-pair cross-correlation signal being provided for each said common receiver location, and cross-correlating the portions of the traces within the cross-correlation parameters of each said receiver-pair having common sources to provide a receiver-pair cross-correlation signal, a receiver-pair cross-correlation signal being provided for each said common source location;

(d) stacking the cross-correlation signals of each said receiver-pair and each said source pair to obtain a stacked cross-correlation signal for each said source-pair and each said receiver-pair; and (e) determining the amplitude spectra within a specified bandpass for the source wavelet of each said designated source location and the receiver wavelet of each said designated receiver location from the stacked cross-correlation signals using a surface-consistent convolutional model;

(f) determining a minimum-phase wavelet spectrum from each said amplitude spectrum; and (g) determining deconvolution filters for each said designated source location and each said designated receiver location from their respective said minimum-phase wavelet spectrum.

13. The method of claim 12 wherein step (e) includes a logarithmic solution of the surface-consistent convolutional model to determine the amplitude spectra.

14. The method of claim 12 wherein the model of step (e) includes a conjugate gradient technique which determines each frequency of interest independently in the amplitude spectrum.

15. The method of claim 14 wherein step (e) includes a logarithmic solution of the surface-consistent convolutional model to determine the amplitude spectra.

16. The method of claim 15 wherein step (e) includes frequency smoothing of each said amplitude spectra.

17. The method of claim 14 wherein step (e) includes a direct solution of the surface-consistent convolutional model to determine the amplitude spectra.

18. The method of claim 17 wherein step (e) includes frequency smoothing of each said amplitude spectra.

19. The method of claim 12 wherein step (f) includes determining the minimum-phase wavelet spectrum for each said amplitude spectrum by using a discrete Hilbert transform.

20. The method of claim 12 wherein step (g) includes determining two-sided deconvolution filters for each said designated source location and each said designated receiver location by a Levinson-Wiener inversion technique.

21. The method of claim 12 including after step (e) the step of editing each said amplitude spectrum to obtain an edited amplitude spectrum and wherein in step (f) the minimum-phase wavelet spectrum is determined from each said edited amplitude spectrum.

22. A method for processing a seismic survey to deconvolve traces from the seismic survey, the traces having been acquired by using a plurality of sources and a plurality of receivers, the traces being indexed by source location and by receiver location, each source location having an associated source wavelet which convolves on each trace produced by that source location and each receiver location having an associated receiver wavelet which convolves on each trace received by that receiver location, comprising the steps of:

(a) selecting cross-correlation parameters such that said cross-correlation parameters will include wavelets from the traces which contain the source wavelet and the receiver wavelet;

(b) selecting a plurality of source-pairs and receiver-pairs having indexed source locations and indexed receiver locations from the seismic survey, the traces of each source-pair being selected from source location indexes associated with two designated source locations, each source-pair having at least one trace indexed to one of the two designated source locations which has a common receiver location with at least one other trace of that said source-pair indexed to the second of the two designated source locations, the traces of each receiver-pair being selected from receiver-location indexes associated with two designated receiver locations, each receiver-pair including at least one trace indexed to one of the two designated receiver locations which has common source location with at least one other trace of that said receiver-pair indexed to the second of the two designated receiver locations, each said source location being included in at least one source-pair is a designated source location, each said receiver location being included in at least one receiver-pair is a designated receiver location;

(c) cross-correlating portions of the traces within the cross-correlation parameters of each said source-pair having common receivers to provide source-pair cross-correlation signals, a source-pair cross-correlation signal being provided for each said common receiver location, and cross-correlating the portions of the traces within the cross-correlation parameters of each said receiver-pair having common sources to provide a receiver-pair cross-correlation signal, a receiver-pair cross-correlation signal being provided for each said common source location;

(d) stacking the cross-correlation signals of each said receiver-pair and each said source pair to obtain a stacked cross-correlation signal for each said source-pair and each said receiver-pair; and (e) determining the amplitude spectra within a specified bandpass for the source wavelet of each said designated source location and the receiver wavelet of each said designated receiver location from the stacked cross-correlation signals using a surface-consistent convolutional model;

(f) determining a minimum-phase wavelet spectrum from each said amplitude spectrum;

(g) determining deconvolution filters for the source wavelet of each designated source location and the receiver wavelet of each designated receiver location from their respective said minimum-phase wavelet spectrum; and (h) deconvolving the traces which are indexed to designated source locations and receiver locations by selecting for each said trace the source deconvolution filter and the receiver deconvolution filter for that said trace and convolving the filters with their respective said trace.

23. The method of claim 22 wherein step (e) includes a logarithmic solution of the surface-consistent convolutional model to determine the amplitude spectra.

24. The method of claim 22 wherein step (e) includes a conjugate gradient technique which determines each frequency of interest independently in the amplitude spectrum.

25. The method of claim 24 wherein step (e) includes a direct solution of the surface-consistent convolutional model to determine the amplitude spectra.

26. The method of claim 25 wherein step (e) includes frequency smoothing of each said amplitude spectra.

27. The method of claim 24 wherein step (e) includes a logarithmic solution of the surface-consistent convolutional model to determine the amplitude spectra.

28. The method of claim 27 wherein step (e) includes frequency smoothing of each said amplitude spectra.

29. The method of claim 22 wherein step (f) includes determining the minimum-phase wavelet spectrum for each said amplitude spectrum by using a discrete Hilbert transform.

30. The method of claim 22 wherein step (g) includes determining two-sided deconvolution filters for the source wavelet of each said designated source location and the receiver wavelet of each said designated receiver location by a Levinson-Wiener inversion technique.

31. The method of claim 22 including after step (e) the step of editing each said amplitude spectrum to obtain an edited amplitude spectrum and wherein in step (f) the minimum-phase wavelet spectrum is determined from each said edited amplitude spectrum.

32. The method of claim 22 also including step (i) blanking sections of each deconvolved trace when a selected ratio of the Root-mean-square energy of that section of a trace to the same respective sections of nearby traces is exceeded whereby sections of traces having excessive noise are removed from each said trace.

* * * * *